US008050283B2

(12) United States Patent
Ladd

(10) Patent No.: US 8,050,283 B2
(45) Date of Patent: *Nov. 1, 2011

(54) NETWORK ROUTER APPARATUS AND METHOD

(76) Inventor: Patrick Ladd, San Marcos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/559,417

(22) Filed: Sep. 14, 2009

(65) Prior Publication Data

US 2010/0074267 A1   Mar. 25, 2010

Related U.S. Application Data

(63) Continuation of application No. 10/843,887, filed on May 11, 2004, now Pat. No. 7,590,144.

(60) Provisional application No. 60/470,395, filed on May 13, 2003.

(51) Int. Cl.
    *H04L 12/28* (2006.01)
(52) U.S. Cl. .......................... 370/401; 725/119
(58) Field of Classification Search .......... 370/352, 370/389, 392, 401, 466, 471; 725/109, 111, 725/119
See application file for complete search history.

(56) References Cited

U.S. PATENT DOCUMENTS

| | | | | |
|---|---|---|---|---|
| 5,528,583 | A * | 6/1996 | Acampora et al. | 370/256 |
| 5,534,913 | A | 7/1996 | Majeti et al. | |
| 5,566,171 | A | 10/1996 | Levinson | |
| 6,006,272 | A * | 12/1999 | Aravamudan et al. | 709/245 |
| 6,178,455 | B1 | 1/2001 | Schutte et al. | |
| 6,208,644 | B1 | 3/2001 | Pannell et al. | |
| 6,208,656 | B1 | 3/2001 | Hrastar et al. | |
| 6,249,523 | B1 | 6/2001 | Hrastar et al. | |
| 6,286,058 | B1 | 9/2001 | Hrastar et al. | |
| 6,295,298 | B1 | 9/2001 | Hrastar et al. | |
| 6,301,223 | B1 | 10/2001 | Hrastar et al. | |
| 6,370,147 | B1 | 4/2002 | Besar | |
| 6,405,253 | B1 | 6/2002 | Schutte et al. | |
| 6,434,171 | B1 | 8/2002 | Ishida | |

(Continued)

FOREIGN PATENT DOCUMENTS

WO    WO 02/21841    3/2002

OTHER PUBLICATIONS

Entropic Communications c.LINK Home Networking Solution for Digital Entertainment Information Sheets, no date, 8 pages, www.entropic.com.

(Continued)

*Primary Examiner* — Ricky Ngo
*Assistant Examiner* — Kan Yuen

(57) ABSTRACT

An improved network router apparatus and associated network architecture is disclosed. In one exemplary embodiment, the router apparatus is adapted to interface between an external network (such as an HFC/DOCSIS digital network) and a local network created using existing HFC cabling within a premises. The router device provides address translation between the single IP address assigned to the router by the external network and the addresses of the individual nodes or access points on the local network through creation of logical ports assigned to various portions of the available bandwidth of the cable system. The router further distinguishes network protocols from the media content streamed over the HFC network, allowing for the foregoing functionality and replacing any existing cable modem. Methods of initiating the router and assigning addresses are also disclosed, as well as business models for leasing the router equipment and access points.

11 Claims, 10 Drawing Sheets

U.S. PATENT DOCUMENTS

| | | | |
|---|---|---|---|
| 6,529,517 B2 | 3/2003 | Hrastar et al. | |
| 6,553,568 B1 | 4/2003 | Fijolek et al. | |
| 6,618,353 B2 | 9/2003 | Merrill et al. | |
| 6,657,991 B1 | 12/2003 | Akgun et al. | |
| 6,687,243 B1 | 2/2004 | Sayers et al. | |
| 6,711,743 B1 * | 3/2004 | Hong et al. | 725/111 |
| 6,822,957 B1 | 11/2004 | Schuster et al. | |
| 6,993,050 B2 | 1/2006 | Desai et al. | |
| 7,068,647 B2 | 6/2006 | Fangman et al. | |
| 7,146,421 B2 | 12/2006 | Syvanne | |
| 7,248,590 B1 | 7/2007 | Liu | |
| 7,283,504 B1 | 10/2007 | Elliott | |
| 2001/0019557 A1 | 9/2001 | Hrastar et al. | |
| 2001/0049825 A1 * | 12/2001 | Hirose et al. | 725/111 |
| 2002/0003803 A1 * | 1/2002 | Kametani | 370/401 |
| 2002/0013696 A1 | 1/2002 | Hama et al. | |
| 2002/0054206 A1 * | 5/2002 | Allen | 348/14.04 |
| 2003/0055962 A1 | 3/2003 | Freund et al. | |
| 2003/0106067 A1 * | 6/2003 | Hoskins et al. | 725/119 |
| 2003/0198215 A1 | 10/2003 | Merrill et al. | |
| 2003/0224784 A1 | 12/2003 | Hunt et al. | |
| 2004/0071149 A1 * | 4/2004 | Kim et al. | 370/401 |
| 2004/0117817 A1 * | 6/2004 | Kwon et al. | 725/31 |
| 2004/0158649 A1 * | 8/2004 | Ophir et al. | 709/250 |

OTHER PUBLICATIONS

Coaxsys #1 in IPTV Networking Press Release entitled "Coaxsys Develops Breakthrough Platform for Home Networking Using Existing TV Coaxial Cable—Exhibiting at E3", Los Angeles, May 14, 2003, 2 pages, http://www.coaxsys.com.

Coaxsys, Inc.—The TVnet™ Standard—TVnet: The Network Standard for Voice, Video, and Data Over Coax Information Sheets, 2 pages, © 2005 Coaxsys, Inc., www.coaxsys.com.

Coaxsys, Inc.—IPTV 7000—Product Brief for Telcos—Coax Ethernet Adapter for Telcos Information Sheets, 2 pages, © 2005 Coaxsys, Inc., www.coaxsys.com.

Coaxial Networks, Inc.—IRIS DC1100 Cable Modem Termination System CMTS + Back Office Servers in one box Information Sheets, 2 pages, © Coaxial Networks, Inc. 2004, www.coaxialnetworks.com.

* cited by examiner

NETWORK ROUTER APPARATUS AND METHOD

PRIORITY

This application is a continuation of and claims priority to U.S. patent application Ser. No. 10/843,887 of the same title and filed on May 11, 2004, which issues as U.S. Pat. No. 7,590,144 on Sep. 15, 2009, which claims priority to U.S. Provisional Application Ser. No. 60/470,395 filed May 13, 2003 having the same title, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to the field of telecommunications and data networking, and specifically to improved apparatus and methods for providing and operating a premises network such as a Home LAN.

2. Description of Related Technology

Coaxial cable systems are now ubiquitous throughout the United States and the rest of the industrialized world. As is well known, these systems distribute content (such as MPEG-encoded data streams) to a plurality of end users, such as home cable system subscribers. Typically, a radio frequency (RF) coaxial cable is used to provide the distributed signal from the cable system head-end to the users (downstream), as well as transmit a limited amount of information or signaling in the reverse (upstream) direction, typically using an out-of-band (OOB) or comparable channel. While many terrestrial cable networks typically have a mixture of different physical topologies and environments as part thereof (including, e.g., coaxial cabling, optical fiber segments, satellite links, or even millimeter wave systems), most utilize coaxial cabling for the last "mile" of service to the end user premises. Furthermore, the great preponderance of homes constructed in the U.S. have internal coaxial cable running throughout, due to its relative ruggedness, good electrical performance, and low cost. Hence, there is a great installed base of coaxial cable-equipped premises in the U.S. and for that matter the rest of the world.

In the typical premises, the coaxial cable is received in a terminal or junction box (perhaps in the user's garage or the like), which is then routed indoors to a wall jack or similar to which the user can then connect their cable modem. This cabling may also be "split" such that service is provided to several different rooms in the same premises. An apartment building or hotel is an extreme example of this, wherein literally hundreds of rooms may be provided a cable tap arising from one primary feed.

More recently, cable systems have also be adapted to handle digital network traffic in addition to the content-based analog or digital signals carried by the network. In this fashion, many different services and capabilities are provided, including Internet browsing, shopping, transmission and reception of e-mail, etc. These network capabilities utilize packetized protocols such as the well known Transport Control Protocol/Internet Protocol (TCP/IP) and the like.

Typically, when the consumer requests internet service from a cable network operator, such as for example a multimedia specific operator (MSO), the MSO generally installs a cable modem or similar device at the consumer's premises, and configures the head-end to connect to the cable modem. The head-end typically contains a Cable Modem Termination System (CMTS) or its equivalent. The CMTS dynamically configures the cable modems in the network with a network address (e.g., IP address) and provides internet access to the cable modem(s).

Unfortunately, this approach does not facilitate home LAN functionality. Typically, MSOs will charge the consumer extra for additional (IP) addresses. Consumers can easily circumvent this charge by purchasing an inexpensive router with network address translation (NAT) or realm specific internet protocol (RSIP) capabilities. In any case, the consumer is forced to wire their premises with Ethernet (IEEE 802.3) or a comparable configuration using a cable medium such as CAT-5, or alternatively install a wireless network such as an IEEE Std. 802.11b system. These "workarounds" are often costly, and in the case of wireless networks, may not provide optimal service for any number of different reasons including signal fading/"cold" spots, lack of reliability, etc.

Furthermore, many wireless LAN devices provide comparatively slow data rates due largely to the foregoing RF interface issues. In many instances, they are simply not as capable as their "hardwired" counterparts.

A variety of different approaches to providing data network services via cable systems (including assignment of network addresses) have been proposed under the prior art. For example, U.S. Pat. No. 5,534,913 to Majeti, et al. issued Jul. 9, 1996 and entitled "Apparatus and method for integrating downstream data transfer over a cable television channel with upstream data carrier by other media" discloses a split channel bridging unit includes a router that operates under the control of a control processor to route packets of information destined for a user to a modulator which is connected to the cable distribution head-end of the cable television system which serves the requesting user. The modulator encodes the digital information transmitted from the router and encodes it in an RF channel to be carded by the television cable. The cable distribution head-end combines this channel with other conventional cable television sources to broadcast these channels to its users. The customer premises equipment of the user includes an RF demodulator and packet receiver which demodulates the RF encoded signals and utilizes the packet receiver to transmit the digital information addressed to the particular user to the user's personal computer. Upstream requests are made by the user by utilizing a modem connection over the public switched telephone network with a terminating modem contained in the split channel bridging unit. Secured low-speed control information is preferably supported bidirectionally by utilizing a modem connection over the public switched telephone network.

U.S. Pat. No. 6,178,455 to Schutte, et al. issued Jan. 23, 2001 and entitled "Router which dynamically requests a set of logical network addresses and assigns addresses in the set to hosts connected to the router" discloses methods and apparatus for addressing the problem of wasting IP addresses by statically assigning them to hosts. When a cable router or RF modem becomes active, it sends a message requesting a set of multiple IP addresses from the head end, which dynamically assigns the set of IP addresses and sends a message comprising the set of IP addresses to the cable router or RF modem. The cable router or RF modem then responds to requests by the hosts for IP addresses by assigning them IP addresses from the set. Furthermore, the set of IP addresses is released when the session terminates with the cable router or RF modem. See also U.S. Pat. Nos. 6,208,656, 6,249,523, 6,286,058, 6,295,298, 6,301,223, 6,405,253, 6,529,517, and 6,618,353, as well as U.S. Application Publication Nos. 20010012292, 20010012297, 20010019557, and 20030198215 assigned to Scientific-Atlanta, Inc., which disclose generally related concepts.

U.S. Pat. No. 6,249,523 to Hrastar, et al. issued Jun. 19, 2001 and entitled "Router for which a logical network address which is not unique to the gateway address in default routing table entries" discloses an asymmetrical network for coupling customer-premises Internet hosts such as personal computers to the Internet. The head end of a CATV system has a high-bandwidth connection to the Internet. The down link connecting the personal computers to the Internet is the cables provided by the CATV system; the up link is a telephone connection to the head end. A router is connected to the down link by means of an RF modem, to the up link by means of an analog modem, and to a LAN which is connected to the PCs. The router routes IP packets for the hosts that are received on the CATV cable to the hosts via the LAN; it routes IP packets from the hosts that are destined for the Internet to the head end via the telephone line. The asymmetrical network conserves IP addresses and addresses on the CATV cable by dynamically allocating the IP addresses for an RF modem's hosts and an address on the CATV cable for the RF modem in response to a request made by the RF modem via the telephone line. It further saves IP addresses by assigning a non-unique IP address to the router for use inside the LAN. Standard TCP/IP protocols can be used to control the asymmetrical network.

U.S. Pat. No. 6,370,147 to Beser issued Apr. 9, 2002 and entitled "Method for addressing of passive network hosts in a data-over-cable system" discloses a method to address passive network devices in a data-over-cable system. A "passive" network device, such as a printer, facsimile machine, computer other network device, is a device that is assigned a network address by the data-over-cable system and does not have a Dynamic Host Configuration Protocol stack to obtain its own network address. A network address assigned to a passive network device by the data-over-cable system is stored in a configuration file for an active network device such as a cable modem that is associated with the passive network device. An active network device has a Dynamic Host Configuration Protocol Stack to obtain a network address. The active network device is initialized with the configuration file including the assigned network address of the passive network device. The active network device registers with a cable modem termination system by sending a registration message that includes the assigned network address for the passive network device. The active network device and the active network device termination system store the network address for the active network device and the assigned network address for the passive network device in internal tables. When data for the passive network device is received on the cable modem termination system it is forwarded to the active network device and then forwarded to the passive network device using the internal tables on the cable modem termination system and active network device. The active network device functions as a router or switch to forward data to the passive network device. The method allows passive network devices without a Dynamic Host Configuration Protocol stack to be used in a data-over-cable system.

U.S. Pat. No. 6,553,568 to Fijolek, et al. issued Apr. 22, 2003 and entitled "Methods and systems for service level agreement enforcement on a data-over cable system" discloses methods and apparatus for service level agreement enforcement on a data-over-cable system. One or more service level agreements are created including one or more class-of-service or quality-of-service parameters. A pool of Internet Protocol addresses is allocated for the one or more service level agreements. Configuration files including service level agreement parameters are used to initialize cable modems or customer premise equipment. When a cable modem or customer premise equipment requests use of a service level agreement, an Internet Protocol address from the pool of Internet Addresses associated with a desired service level agreement is assigned. The service level agreements are enforced using the Internet Protocol address from a cable modem termination system including an integral switch cable access router and a bandwidth manager. The cable modem termination system with integral components are duplicated to provide a back up in case of failure and increase reliability for using service level agreements. The cable access router enforces maximum rate limits for service level agreements. The methods and system allow service level agreements to be used on a data-over-cable system without adversely affecting performance or throughput on the data-over-cable system. The methods and system may also help provide service level agreements in a data-over-cable system in a more reliable manner.

United States Patent Application Publication No. 20030055962 to Freund, et al. published Mar. 20, 2003 entitled "System providing internet access management with router-based policy enforcement" discloses a computing environment with methods for monitoring access to an open network such as the Internet. The system includes one or more client computers, each operating applications requiring access to an open network, such as a WAN or the Internet, and a router or other equipment that serves a routing function (e.g., a cable modem) for the client computers. A centralized security enforcement module on the router maintains access rules for the client computers and verifies the existence and proper operation of a client-based security module on each client computer. The router-side security module periodically sends out a router challenge via Internet broadcast to the local computers on the network. If the client-side security module is installed and properly operating, the client-side security module responds to the router challenge. The responses received by the router-side security module are maintained in a table. Each time the router receives a request from a client computer to connect to the Internet, the router-side security module reviews the table and analyzes whether or not the computer requesting a connection to the Internet properly responded to the most recent router challenge.

United States Patent Application Publication No. 20030224784 to Hunt, et al. published Dec. 4, 2003 and entitled "Communications system for providing broadband communications using a medium voltage cable of a power system" discloses a broadband service communication system using an MV cable for conveying RF signals in a network segment, which includes a distribution center (PLT controller) and a plurality of power line telecommunication (PLT) stations. The PLT controller has a distribution modem for conveying downstream and upstream RF signals to and from the PLT stations through the MV cable via couplers. Each PLT station has a modem for conveying the downstream and upstream RF signals via couplers and for conveying media signals to one or more customer premises equipment (CPE) via, e.g. wireless links. The PLT controller controls each PLT station regarding upstream communications transfer of all downstream communications and also controls. The PLT controller can be connected via a router to a WAN to convey media signals to and from the WAN. Repeaters and interlinks are used to join multiple network segments.

Despite the foregoing, no suitable methodology or architecture for providing easily installed and highly economical network services for premises currently exists, especially within the home or residential context. Accordingly, there is a need for improved apparatus and methods for providing network services over a cable system to a plurality of end users. Such improved apparatus and methods would be readily implemented on existing infrastructure (such as, for example, the installed coaxial cable system within most homes), would be effectively transparent to content-based signals being sent over the cable network (such as MPEG-encoded video), and which would not require excessive bandwidth or resource allocation. Such improved solution would also ideally economize on network address allocations, thereby minimizing cost to the end user(s). The individual end users of a given premises would also be able to communicate among themselves without resorting to transmissions over the larger external (bearer) network.

SUMMARY OF THE INVENTION

The present invention satisfies the aforementioned needs by improved methods and apparatus for providing network services over a network, including a content-based cable TV network.

In a first aspect of the invention, an improved network router apparatus is disclosed. In one exemplary embodiment, the router apparatus is adapted to interface between an external network (such as an HFC/DOCSIS digital network) and a local network created using existing HFC cabling within a premises (such as a home). The router device provides address translation between the single IP address assigned to the router by the external network and the addresses of the individual nodes or access points on the local network through creation of logical ports assigned to various portions of the available bandwidth of the HFC system. The router further distinguishes network protocols from the media content streamed over the HFC network, allowing for the foregoing functionality and replacing any existing cable modem.

In a second aspect of the invention, an improved media (content) and data network architecture is disclosed. In one exemplary embodiment, the architecture comprises an HFC front end network coupled to a LAN back end network (such as within a user's home) via the aforementioned cable router. The cable router acts to both pass streamed content (e.g., video) to the users, as well as upstream signaling, while also providing for high-speed data connectivity between the external network and the LAN. The LAN is effectively hidden from the external network within address space, since the router uses network address translation (NAT) or realm specific internet protocol (RSIP) to convert the single IP address assigned to the router to a plurality of addresses for each node on the LAN using a logical port allocation scheme. High speed upstream and downstream data channels between LAN nodes/access points and router are provided, using the available bandwidth of the HFC system.

In a third aspect of the invention, an improved method of initiating the foregoing router coupled between an external network and local network is disclosed. In one exemplary embodiment, the method comprises: generating at the router a downstream transmission channel to any local network access nodes; detecting the downstream transmission channel at the node(s); sending a network address request on an upstream transmission channel from the node to the router; assigning the requesting access node an address; and acquiring the router's network address via the external network.

In a fourth aspect of the invention, an improved business method is disclosed. In one exemplary embodiment, the method comprises leasing the aforementioned router apparatus and local network access points to the consumer. The router leased by the consumer receives a single IP address from the bearer (e.g., HFC) network and uses NAT or RSIP to convert it to multiple IP addresses on the local network. The lease rates for the router with multiple access nodes can be made comparable to those associated with assigning a plurality of different IP addresses (via a plurality of different routers) within the same premises, thereby steering consumers away from the practice of "piggybacking" a low-cost router onto the back of a cable modem in order to obtain local network IP addresses, which tends to subrogate cable system operator leasing revenues.

In a fifth aspect of the invention, an improved network router protocol configuration is disclosed. The router is generally configured to convert proprietary network protocols to other useful protocols. In one exemplary embodiment, the front end operates according to the proprietary protocol, while back end of the router passes DOCSIS signals to downstream devices, as well as the native protocol of the local high speed (premises) network. The router therefore appears to be a standard cable modem to downstream devices, although operating according to a proprietary protocol on its front end.

In a sixth aspect of the invention, a method of doing business over a network is disclosed, the method generally comprising: providing a premises network router apparatus adapted for use in a cable network, the network being adapted to deliver both data and content-based signals, the router being able to receive both the signals; assigning a first network address to the router; receiving the data signals at the router based on the first network address; translating, within the router, the first address to at least one second local network address; and delivering, based on the second local network address, at least a portion of the data signals to a user apparatus operatively coupled to the router apparatus.

DETAILED DESCRIPTION OF THE INVENTION

Figure 1:
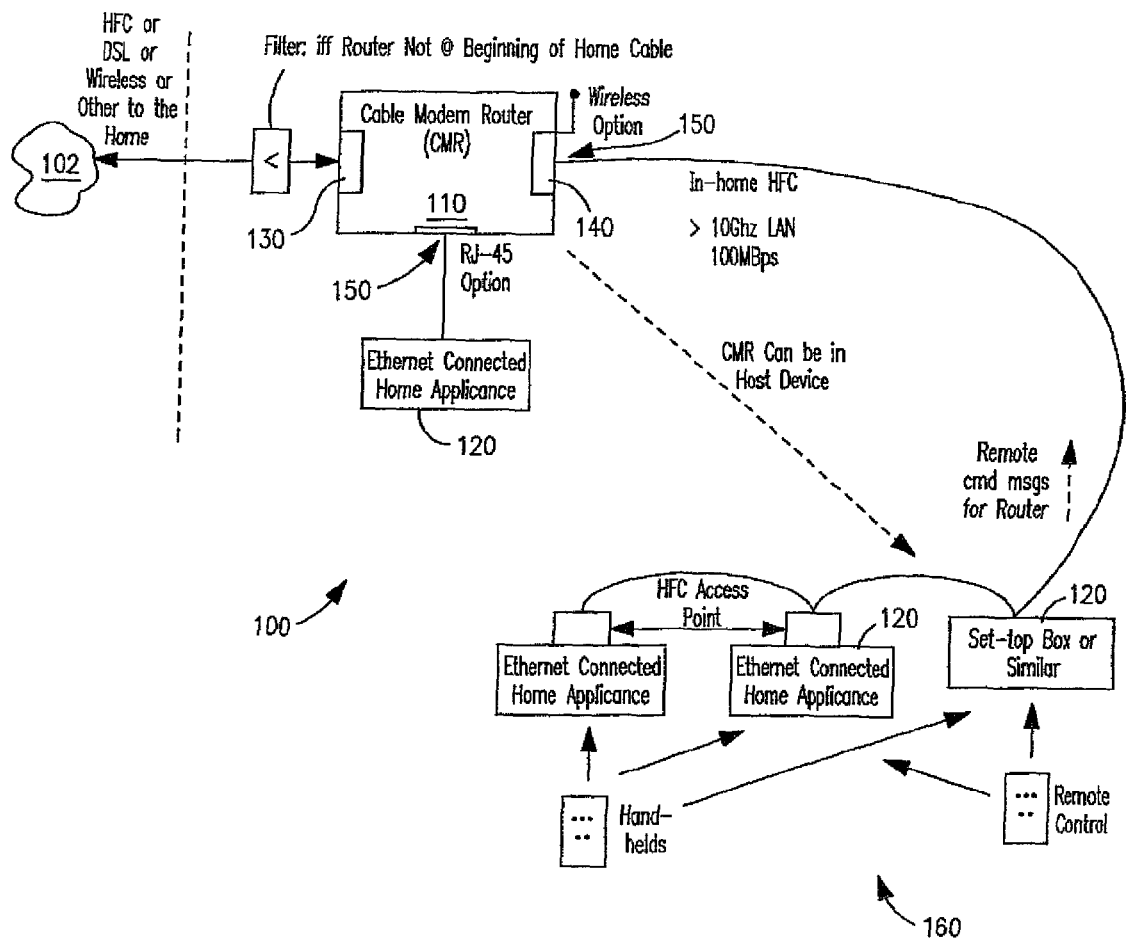
FIG. 1 is functional block diagram illustrating one exemplary network architecture of the present invention, including the improved router apparatus.

Reference is now made to the drawings wherein like numerals refer to like parts throughout.

As used herein, the term "application" refers generally to a unit of executable software that implements theme-based functionality. The themes of applications vary broadly across any number of disciplines and functions (such as e-commerce transactions, brokerage transactions, mortgage interest calculation, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML), and the like, as well as object-oriented environments such as the Common Object Request Broker Architecture (CORBA), Java™ (including J2ME, Java Beans, etc.) and the like.

As used herein, the term "head-end" refers generally to a networked system controlled by an MSO that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers such as the Hitachi "VisionPlate", personal communicators such as the Motorola Accompli devices, Motorola EVR-8401, J2ME equipped devices, cellular telephones, or literally any other device capable of interchanging data with a network.

As used herein, the term "digital subscriber line" (or "DSL") shall mean any form of DSL configuration or service, whether symmetric or otherwise, including without limitation so-called "G.lite" ADSL (e.g., compliant with ITU G.992.2), RADSL (rate adaptive DSL), VDSL (very high bit rate DSL), SDSL (symmetric DSL), SHDSL or super-high bit-rate DSL, also known as G.shdsl (e.g., compliant with ITU Recommendation G.991.2, approved by the ITU-T February 2001), HDSL (high data rate DSL), HDSL2 (2nd generation HDSL), and IDSL (integrated services digital network DSL).

As used herein, the term "integrated circuit (IC)" refers to any type of device having any level of integration (including without limitation ULSI, VLSI, and LSI) and irrespective of process or base materials (including, without limitation Si, SiGe, CMOS and GAs). ICs may include, for example, memory devices (e.g., DRAM, SRAM, DDRAM, EEPROM/Flash, ROM), digital processors, SoC devices, FPGAs, ASICs, ADCs, DACs, transceivers, and other devices, as well as any combinations thereof to also include for example mixed signal devices.

As used herein, the term "display" means any type of device adapted to display information of any kind, including without limitation CRTs, LCDs, TFTs, plasma displays, LEDs, holographic or 3-D projection, and fluorescent devices.

Lastly, the term "processor" is meant to include any integrated circuit or other electronic device (or collection of devices) capable of performing an operation on at least one instruction including, without limitation, reduced instruction set core (RISC) processors, microprocessors (e.g., CISC devices), microcontroller units (MCUs), CISC-based central processing units (CPUs), reconfigurable compute fabrics (RCFs), and digital signal processors (DSPs). The hardware of such devices may be integrated onto a single substrate (e.g., silicon "die"), or distributed among two or more substrates. Furthermore, various functional aspects of the processor may be implemented solely as software or firmware, or any combinations thereof, associated with the processor.

Overview

Consumers with access to a digital cable network may have the option to access internets (such as the Internet) via that network. When the consumer requests internet service from a cable network operator, such as for example a multimedia specific operator (MSO), the MSO generally installs a cable modem or similar device at the consumer's premises, and configures the head-end to connect to the cable modem. The head-end typically contains a Cable Modem Termination System (CMTS) or its equivalent. The CMTS dynamically configures the cable modems in the network with a network address (e.g., IP address) and provides internet access to the cable modem(s).

Unfortunately, the foregoing prior art approach does not facilitate home LAN functionality. Typically, MSOs will charge the consumer extra for additional (IP) addresses. Consumers can easily circumvent this charge by purchasing an inexpensive router with network address translation (NAT) or realm specific internet protocol (RSIP) capabilities. In any case, the consumer is forced to wire their premises with Ethernet (IEEE 802.3) or a comparable configuration using a cable medium such as CAT-5, or alternatively install a wireless network such as an IEEE Std. 802.11b system. These "workarounds" are often costly, and in the case of wireless networks, may not provide optimal service due to Rayleigh fading, "blind spots", interference due to other RF systems, sunspots, etc., or other phenomenon associated with wireless transmission of data. Significant error correction (e.g., Viterbi, Reed-Solomon, turbo codes, or similar FEC) or other measures (such as MIMO) is required on such systems as well to address such issues. Current generation WiFi systems are also often noted for their lack of reliability, operational predictability, and incompatibility between various hardware and software components and layers in their protocol stacks.

Furthermore, many wireless LAN devices provide comparatively slow data rates due largely to the foregoing RF interface issues. In many instances, they are simply not as capable as their "hardwired" counterparts.

The potential and as of yet unquantified risk of radiated electromagnetic energy (EMR) is also present when consumers are exposed to emissions from the antennae of such wireless systems, even when radiating at low power.

Hence, the present invention addresses these shortcomings by providing a cost-efficient router apparatus and method that it can be used to create a Home LAN using the existing coaxial or similar cable of the premises. This eliminates the need for expensive re-wiring of the premises, and the need for other types of network devices, routers or equipment "workarounds". Rather than using hard-wired port connections on the output, the exemplary cable router of the present invention uses available bandwidth on the existing cable to create logical ports. Thus, it is configurable for the individual network structure of the home or other similar premises.

Description of Exemplary Embodiments

Exemplary embodiments of the apparatus and methods of the present invention are now described in detail. While these exemplary embodiments are described in the context of an HFC or similar cable system architecture having an MSO, CMTS, digital networking capability, and plurality client devices, the general principles and advantages of the invention may be extended to other types of architectures, whether broadband, narrowband, or otherwise, the following therefore being merely exemplary in nature.

Furthermore, while an exemplary Ethernet (IEEE Std. 802.3) network is described for the end user network, it will be recognized that any number of different networking standards, protocols, and/or topologies well known in the art may be implemented consistent with invention, including for example token ring, X.25, and Gigabit Ethernet.

It will also be appreciated that while described generally in the context of a consumer (i.e., home) end user domain, the present invention may be readily adapted to other types of environments (e.g., commercial/enterprise, government/military, etc.) as well. For example, the present invention contemplates an enterprise variant, wherein existing cabling within a company's main office is used as the basis of the LAN. Alternatively, such a system could be used to efficiently distribute and receive content at a hotel, residential apartment/condominium complex, governmental installation, national laboratory or even a mobile platform such as ship (e.g., luxury cruise ship) or aircraft. Myriad other applications are possible.

Referring now to FIG. 1, an exemplary embodiment of the network architecture 100 according to the invention is shown. Generally, the architecture 100 comprises a bearer or front end network 102, a cable modem router (CMR) 110 and one or more appliances 120 in signal communication with the CMR 110. The CMR 110 provides end-to-end network support for the end user's domain 160 from the cable operator (e.g. MSO), with less hardware than that used by the prior art for implementing such a LAN, as previously discussed herein.

Figure 1A:
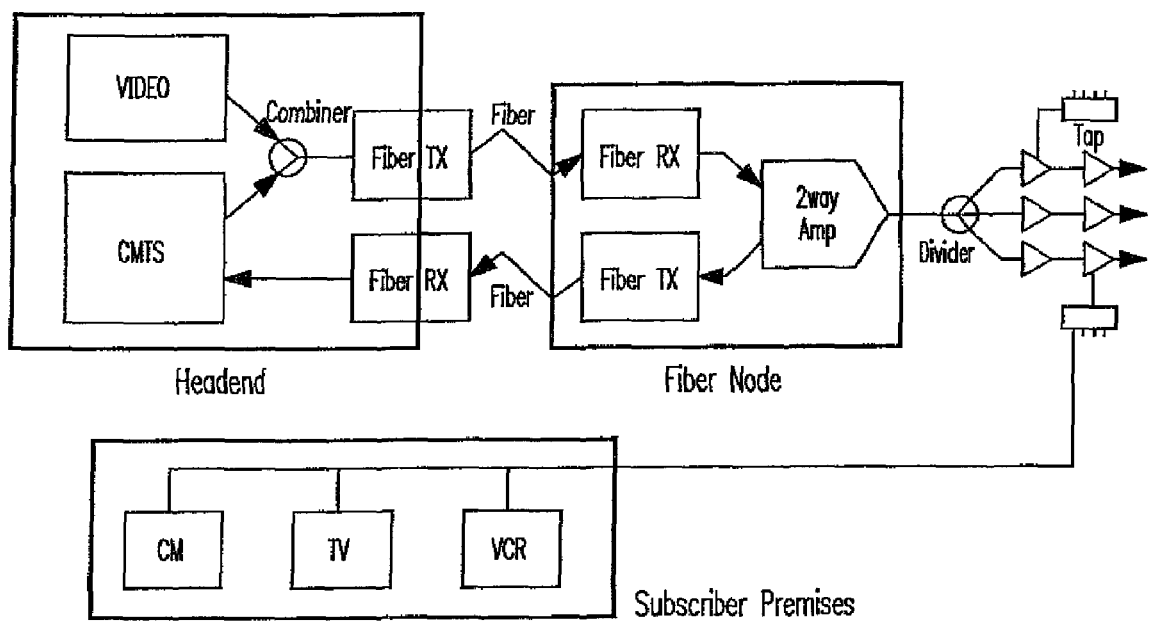
FIG. 1a is a functional block diagram illustrating a typical HFC network topology.

The cable modem router (CMR) 110 is essentially an interface element between the network 102 (which may comprise an HFC network, such as in FIG. 1a, digital subscriber line (DSL) network via telco or service provider loop, satellite network, Broadband Power Line (BPL) network, Wide Area Network (WAN), or any combinations thereof), and one or more end user devices 120. The present invention is in no way limited to HFC-based bearer networks, although it does advantageously make use of existing (HFC) cable installed within the end user's premises. The network 102 functions to provide a communications channel to/from the end user device(s) 120, via the CMR 110. A front end interface 130 and associated protocol stack, as well as a back end interface 140 (and stack) are generally positioned logically between the network 102 and the end user 120, within the CMR 110. The construction and operation of the front end 130 and back end 140 of the CMR 110 are described subsequently herein. The CMR 110 of the exemplary embodiment has one or more "physical" connection ports located thereon for coupling to the network 102 and the end user devices 120, with several different types of interfaces available. Examples of physical interfaces which may be used with the CMR 110 include, inter alia, RJ-45 connectors, RJ-11 connectors, RJ-21 connectors, coaxial cable connectors, BNC connectors, USB connectors, IEEE-1394 connectors and the like, as well as wireless couplings to include for example IrDA, IEEE Std. 802.11, Bluetooth 2.4 GHz, and UWB (including, e.g., TM-UWB, DSSS and OFDM variants).

It is noted that in the present context, any use of such wireless interfaces is generally not for distribution to the plurality of different end user devices 120 within the premises (as in a typical prior art home wireless LAN arrangement), but rather for coupling to the existing cabling within other parts of the premises. For example, it may be desirable to couple data received via a satellite TV receiver in one part of the premises to the indigenous cable wiring disposed throughout the premises via a wireless interface. However, in the case of an HFC bearer network such as shown in the exemplary embodiment of FIG. 1, no such interface (whether physical or wireless) is needed.

As yet another alternative (described in greater detail below), the wireless interface associated with one or more physical ports of the CMR can act as a "base station" of sorts for mobile or client devices within the home, such as PDAs, laptops, handhelds, and the like.

Via the front end interface 130, the bearer network 102 delivers one or more communications channels in the prevailing environment of that network (typically 6 MHz wide analog RF in the case of an HFC local distribution, although other environments such as digital, wireless RF, or even optical may be used) to the CMR 110, for the purpose of providing both upstream and downstream information data transfer. As used herein, the terms "front end interface" and "back end interface" are used to refer to any hardware, firmware, software, or other combination thereof which provides data interface, signal filtration or conditioning, modulation/demodulation, and/or protocol recognition and translation (if any) between the network 102 and the CMR 110, and the CMR 110 and the end user devices 120, respectively, as described in greater detail below.

Via the back end interface 140, the end user(s) 120 have access to one or more physical connections 150 on the CMR 110. The physical connections 150 include, inter alia, interfaces of the type previously described herein for distributing information both to and from various client or end user devices within end user domain 160, as well as to the bearer network 102 via the CMR 110.

Figure 2:
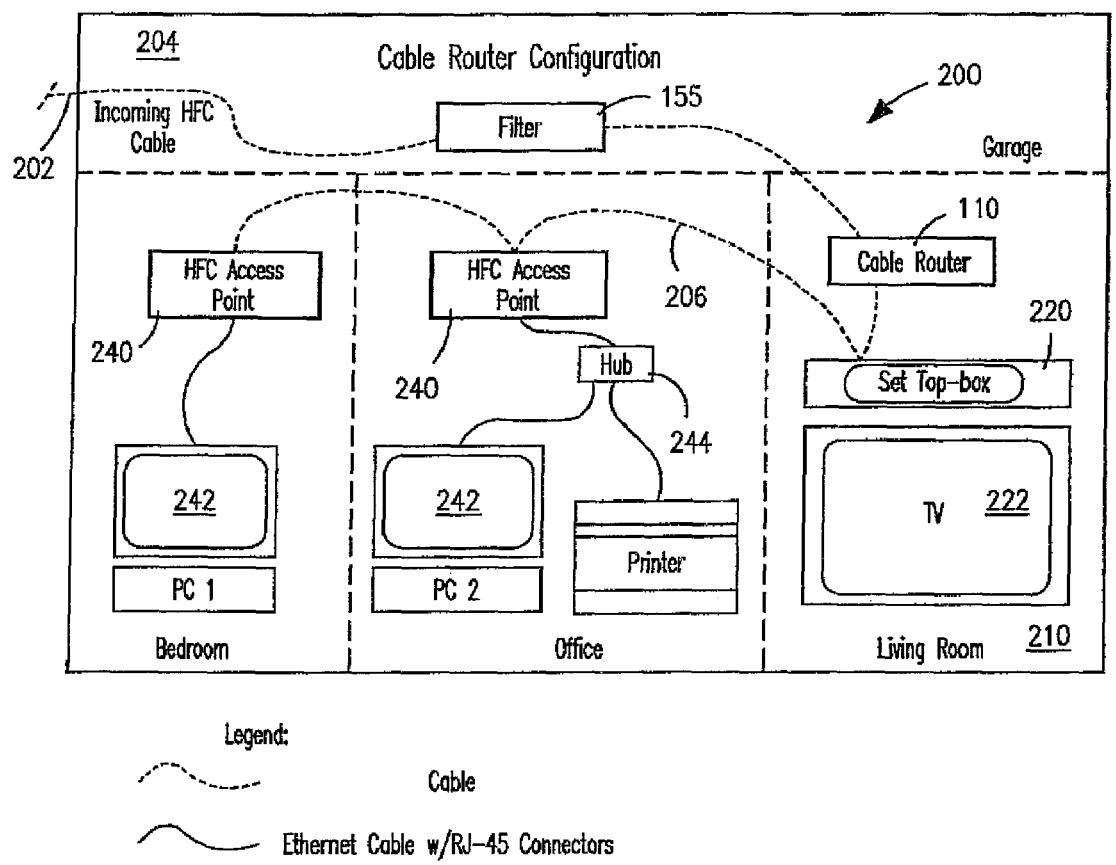
FIG. 2 is a functional block diagram illustrating one exemplary back end LAN architecture incorporating the router of FIG. 1.

FIG. 2 illustrates one exemplary embodiment of the "back end" or end-user architecture 200 according to the invention. In this architecture 200, a plurality of end user devices are connected in a series (daisy-chained) and/or parallel configuration (not shown), depending on the indigenous wiring in the premises being served. For example, as shown in FIG. 2, the incoming distribution cable 202 is received within the garage 204 of the user's home, the signal then distributed via the existing coaxial or similar cable 206 within the premises to the CMR 110 which is disposed, for example, in the user's living room 210. Advantageously, such coaxial cable has been widely installed in premises, including nearly all homes in the U.S., since the mid 1980s. Hence, according to the present invention, the user may simply purchase (or lease, or otherwise be given) the CMR 110 and connect it directly to the cabling within their structure, in effect creating an "instant LAN". This is in some ways analogous to the well known HPN and Homeplug™ approaches, which each utilize existing wiring (i.e., telco wiring and 115 VAC 60 Hz ac wiring, respectively) to accomplish local area network functionality. However, as will be shown herein, the approach of the present invention carries with it additional benefits not provided by these other schemes.

Optional in-line filtration is used to, inter alia, block any signals generated on the CMR communication channels from reaching the bearer network 102. One or more filters 155 are optionally positioned between the cable 300 and the CMR 110 for the purpose of conditioning the signal, such as allowing only certain desired frequencies to pass from or to the CMR 110. Any number of well known filter or signal conditioning types or configurations may be employed for this purposes, including, e.g., high-pass, low-pass, pass-band, and band-stop filters. More complex software-based filtering may also be employed, the "filter" 155 being equipped with intrinsic processing capability (such as a DSP) adapted to perform functions such as FIR filtering, error correction, modulation/demodulation, and the like.

The CMR output or "back end" 140 is connected as an input to a digital set-top box (DSTB) 220, which performs several functions including: (i) providing the streamed cable signal ("content") to the user device, here a television 222; (ii) providing an interactive environment wherein the user may communicate with the MSO/CMTS via upstream in-band or OOB signals; and (iii) distributing the streamed or other content to other "downstream" set-top devices or televisions (not shown). It will be appreciated that while a digital STB is shown, analog STBs may be used as well.

As part of this last function, the indigenous cable present throughout the user's premises is used to distribute the streamed content, as is well known in the prior art. However, in the illustrated architecture 200, one or more cable access points 240 are disposed throughout the premises downstream of the DSTB 220 and the CMR 110, such that other end-user devices may also access the cable "network" and use the latter in effect as a LAN. In the illustrated embodiment, these other devices 242 comprise personal computers (PCs) which are connected to their respective cable access points 240 via any number of data interfaces as described in greater detail below. Intermediary devices such as hubs 244, other routers, etc. of the type well known in the data networking arts may be used as well to implement additional functionality, as shown in FIG. 2.

The access points 240 of the architecture of FIG. 2 in effect provide coupling between the prevailing hardware/software environment of the PCs 242 and that of the back end cable network. Using signal bandwidth available on the existing cable network, one end user device 242 can communicate with another device on the premises as if the two devices were coupled directly, such as via a traditional CAT-5/hub/CAT-5 cabling arrangement in an IEEE 802.3 Ethernet arrangement. It will also be readily apparent that the access points 240 may include a "pass through" HFC interface, wherein in-band or content signals (e.g., MPEG encoded video) may be distributed to a local monitor, DSTB, or other device in addition to the network data previously described.

Figure 3:
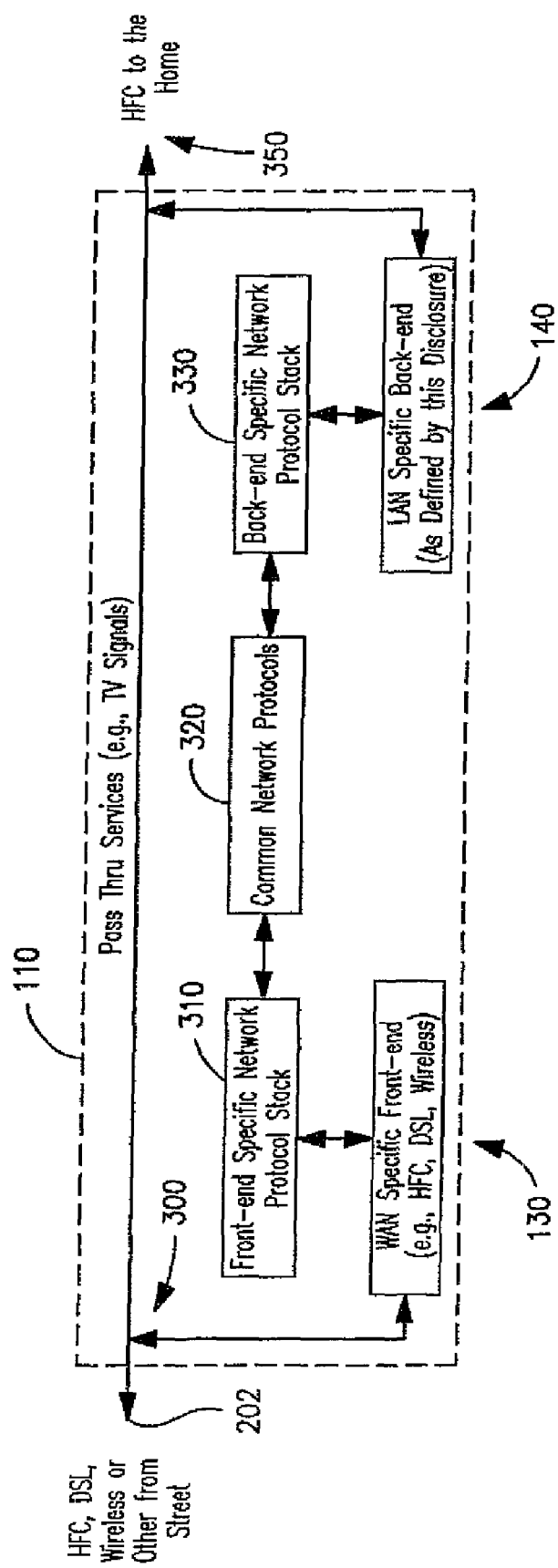
FIG. 3 is a logical block diagram of an exemplary router configuration, including front and back end interfaces and associated protocol stacks.
Figure 3A:
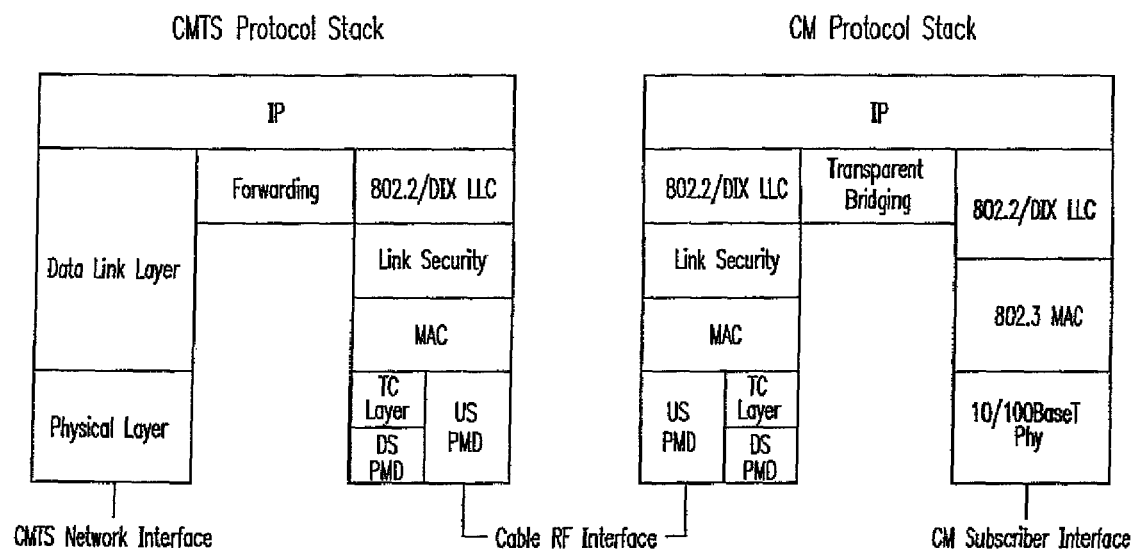
FIG. 3a is a graphical representation of a typical DOCSIS protocol stack.
Figure 3B:
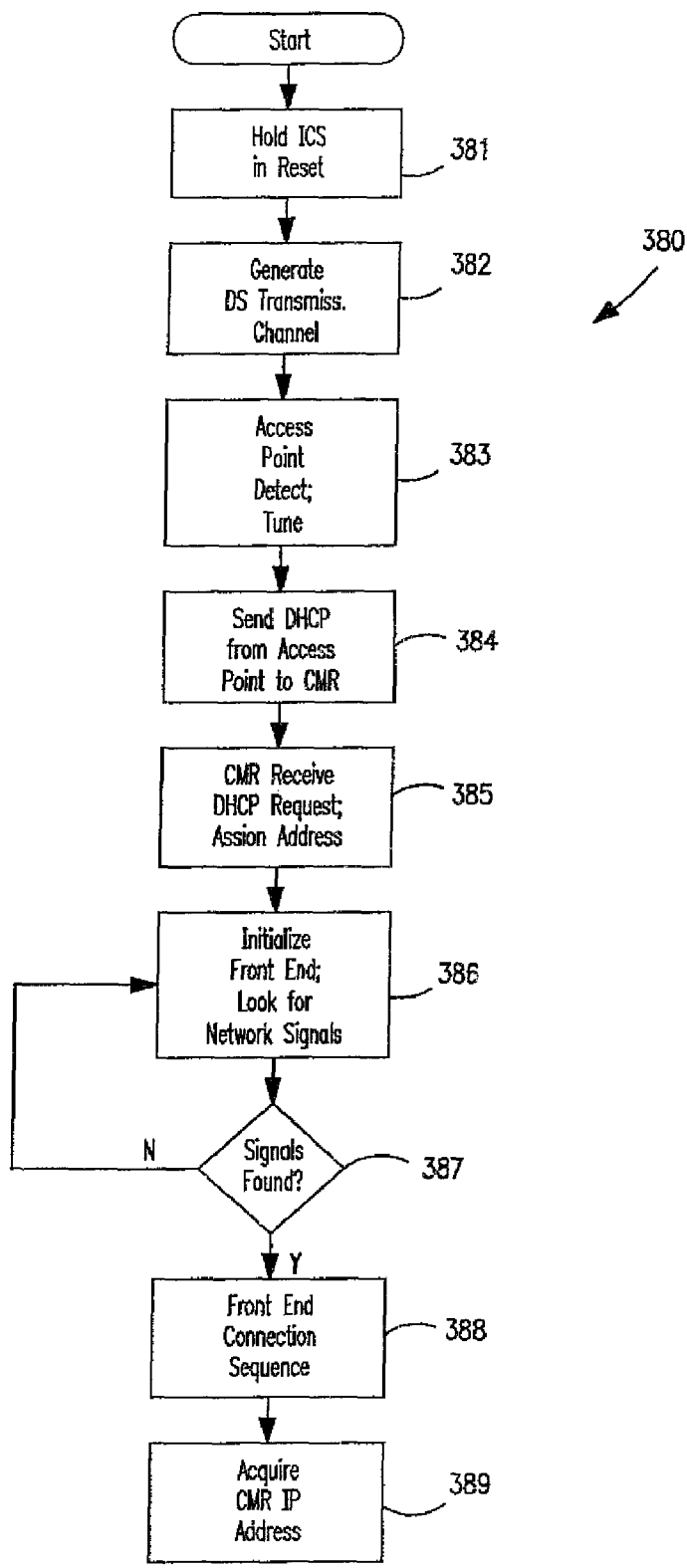
FIG. 3b is a logical flow diagram illustrating one exemplary embodiment of the router initiation method according to the invention.
Figure 3C:
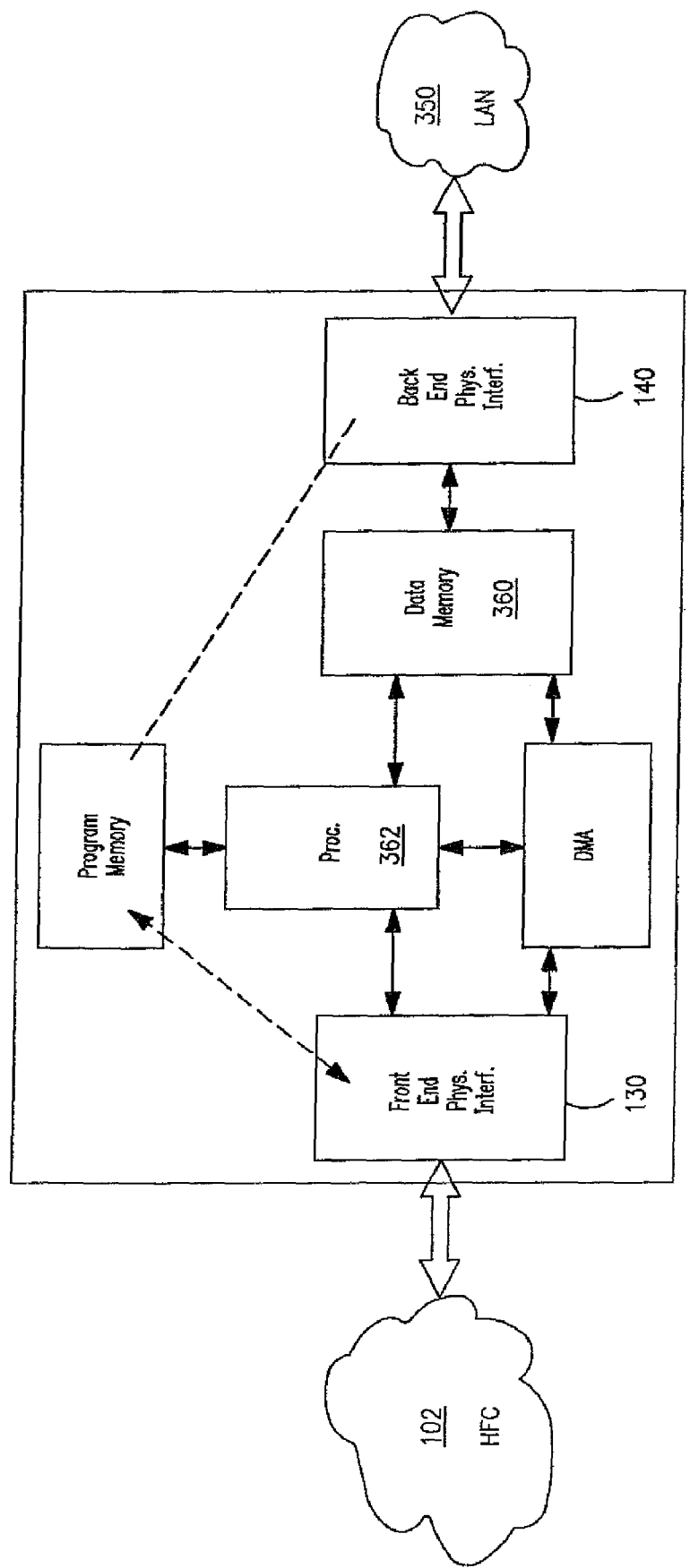
FIG. 3c is functional block diagram of an exemplary hardware configuration of the router of FIG. 3.

Referring now to FIGS. 3-3c, one exemplary configuration of the CMR 110 of the network architecture 100 of FIGS. 1 and 2 is described. It will be appreciated that several alternative configurations of the CMR 110 are contemplated in the present invention, such alternative configurations being readily constructed by those of ordinary skill provided the present disclosure.

In the illustrated embodiment, an HFC network 102 compliant with the Data Over Cable Services Interface Specification (DOCSIS) protocols is coupled to the CMR 110, although it will be recognized that various other data protocols may be utilized. As is well known, DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream). As used herein, the term "DOCSIS" refers to any of the foregoing, as well as subsequent versions thereof.

It will be recognized, however, that networks and/or the CMR (or other host devices) compliant with other standards may be used consistent with the invention. For example, OCAP-compliant devices are required to support both DOCSIS and DAVIC (i.e. OOB). OCAP utilizes a reverse channel, where either DOCSIS or DAVIC are used to enable two-way communications with the head-end. See, e.g., SCTE 55-1 and SCTE 55-2, both incorporated herein by reference in their entirety. A host device must support the hardware commonality between these specifications, and the POD implements the proprietary layers depending upon the head-end type. An OCAP compliant host must support a DOCSIS Set-top Gateway (DSG) that allows the host to switch between OOB and DOCSIS based on signaling received from the network. In DAVIC mode, the reverse channel comes strictly from the POD in the Extended Channel. A host can open IP or MPEG flows to receive OOB data. In DOCSIS mode, reverse channel messaging derives from a cable modem and is sent to the host. The host must feed IP and MPEG information bound for the POD over the Extended Channel to the POD. Thus, in the OOB case, reverse channel messaging flows from the POD to the host yet in the DOCSIS case the opposite is true.

Accordingly, the CMR 110 of the present invention can be configured in multiple different ways to provide the necessary forward and reverse channel functionality. For example, the CMR 110 could be configured to convert to DOCSIS (in that OOB is comparatively slow and will eventually become obsolete). In addition, the CMR could be configured to support a proprietary transmission (e.g. Narad) and convert both OOB and DOCSIS to this proprietary format. As yet another alternative, the CMR might simply forward either protocol to the relevant access points. Myriad other alternatives are possible, as will be appreciated by those of ordinary skill provided the present application.

The network 102 of FIG. 1 provides both upstream and downstream information flow to and from the end user devices 120, via the CMR 110. The CMR 110 advantageously utilizes available bandwidth on the incoming communications channel from the network 102 to create a plurality of logical ports on the CMR 110, such that an individually configurable network is created at the end user domain 160 as previously described with respect to FIG. 2. The CMR 110 may take the place of a cable modem and can integrate any required DSTB functionality if desired, and further obviates the need for additional wiring hardware (e.g., CAT-5 or similar custom cabling) to create a network and provide end-to-end Home LAN support from the cable operator (e.g., MSO).

In the embodiment of FIG. 3, the incoming (e.g., HFC) cable 300 is received at the front end 130 of the CMR 110, such as via at least one physical connector 135. As shown in FIG. 3, the exemplary CMR 110 generally comprises a front end interface 130, front-end protocol stack 310, common protocol stack or environment 320, back-end protocol stack 330, and back end interface 140. In the illustrated embodiments, the aforementioned protocol stacks 310, 320, 330 each comprise computer programs running on a digital processor, although at least portions of this functionality may be embodied in hardware such as in an ASIC, in embedded devices, and the like. It will also be recognized by those of ordinary skill that other protocol stack and translation architectures may be used consistent with the invention, such as where all protocol functionality is integrated into one or two devices within the CMR 110

The front end interface 130 provides the required physical layer (PHY) interface between the analog RF (e.g., QAM/TDMA) signal present on the HFC network 102 of FIG. 1, and the digital domain of the CMR processing environment. For example, in the illustrated embodiment, the digital domain of the CMR 110 and the front end protocol stack 310 are configured to detect protocols native to their own environment on the HFC network connection 300, such as the well known Internet Protocol (IP).

Any signals not associated with internet protocols, such as MPEG coded TV signals, are passed through to the premises cable network 350. It will be appreciated that while the representation of FIG. 3 shows such pass-through of these signals directly from the HFC network to the local or backend network 350, the physical embodiment of the device 110 may pass these signals through the first and second interfaces 130, 140 and their associated protocol stacks. Both "in-line" and "stand-aside" embodiments are hence contemplated by the invention.

Any network protocols received at the front-end such as DOCSIS are detected by the front-end stack 310 and accordingly processed.

FIG. 3c illustrates one exemplary hardware configuration for the router 110 of FIG. 3. When the PHY layers of the front end interface 130 receive data from the network 102 they move it to memory 360 (e.g., RAM) in the CMR 110 in a format that is specific to the network 102. The CMR processor 362 and software running thereon extracts the common network protocols (e.g., TCP/IP, HTTP, UDP, SNMP, RTP/RTCP, SIP, etc.) carried in the network specific protocols using readily available software protocol stacks. The CMR 110 of the present embodiment uses the NAT or RSIP protocols to allow multiple devices on the user's cable LAN to use a single IP address provided by the ISP on the network 102, thereby avoiding the requirement of assigning multiple IP addresses to the various end user devices 120 as in a conventional prior art arrangement. The user's cable network is in effect "hidden" from the ISP in IP address space.

On the premises cable network (e.g., Home LAN) back end interface 140, the CMR 110 generates at least two channels for network traffic. One channel accommodates high-speed transmission to any cable access points 240 on the Home LAN. The other channel accommodates high-speed reception of data from any of the access points. There are multiple approaches to implementing high-speed data channels in a cable network that do not interfere with TV or other content signals between 5 MHz and 860 MHz, such approaches being well known to those of ordinary skill and accordingly not described further herein. For example, an FDMA approach wherein different frequency bands out of the "content" bands are assigned to the two aforementioned channels may be used. Alternatively, one frequency band which is accessed via TDMA may be used. As yet another alternative, a spread spectrum (e.g., FHSS or DSSS) access technique may be used.

The Home LAN side of the network architecture of FIGS. 1 and 2 can be implemented using any number of different access and control techniques as well. Herein lies a fundamental distinction of the present invention; i.e., that the premises "LAN" is implemented using existing (e.g., HFC) cable, as opposed to the CAT-5 or similar cabling required by the prior art. See, e.g., the Narad Broadband Access Network (NBAN) manufactured by Narad Networks of Westford, Mass.

Since the CMR 110 of the present invention is intended to replace the cable modem (CM) of the prior art in the user's premises, the CMR 110 also must perform typical modem negotiation functions on initiation. For example, a typical CM initiation sequence may comprise:

1. scan downstream (DS), synchronize, and listen for DOCSIS;
2. listen for upstream descriptor(s);
3. establish upstream (US) connectivity; perform power ranging
4. establish IP connectivity (DHCP);
5. determine time of day (RFC 868);
6. download operational parameters (TFTP);
7. register with CMTS; and
8. establish baseline privacy (public key, DES).

Under a typical DOCSIS/HFC forwarding scheme, the DS and US channels are at different frequencies, with each channel being simplex or unidirectional in nature. The DS channel is typically a shared media channel, while the US is a point-to-point channel. In terms of protocol stack, the link layer is typically structured as an IEEE 802.3 (Ethernet) layer with a logical link control (LLC) sublayer, link-layer security sublayer (DOCSIS), and media access control (MAC) sublayer. FIG. 3a illustrates a typical DOCSIS protocol stack used in an HFC/IP system, this stack being merely exemplary as previously described herein.

In terms of the MAC sublayer, a typical MAC IP forwarder entity connects the DS and US channels. The CMTS controls available bandwidth, thereby providing a collision-free environment. Similarly, a stream of TDMA mini-slots is created in the US channel.

A physical media dependent (PMD) sublayer is also provided, with the DS channel having for example QAM-64 or QAM-256 modulation in a 6 MHz carrier (27 or 38 Mbps), and the US with QPSK or QAM-16 modulation and a 200-3200 kHz carrier (up to 10 Mbps).

In the exemplary CMR 110 of the present invention, the initiation sequence of FIG. 3b is used. The CMR will execute the same startup sequence regardless of whether the startup is caused by a warm reset (i.e., pressing a reset button), or a cold boot (i.e., cycling the power to the CMR). As shown in FIG. 3b, the sequence 380 comprises first holding the chipsets associated with the front-end and back-end interface 130, 140, which may be integrated into a single device, in reset until programmed to be quiescent (step 381). Next, the back-end interface chipset generates the downstream transmission channel to any cable access points 240 (step 382). When an access point 240 detects the downstream transmission channel, it tunes to that channel (step 383). Per step 384, the detecting access point 240 then sends a DHCP or similar request on the upstream transmission channel to the CMR 110. As is well known in the art, the DHCP protocol is a protocol for automating the configuration of computers that use IP traffic. The CMR 110 assigns the requesting access point 240 an IP address and responds accordingly (step 385). Such IP address may take the form of the well known IPv4 or IPv6 formats, although it will be appreciated that other formats and protocols may be used for IP addressing, such as for example the well-known Mobile IP format.

The front-end interface chipset is the taken out of reset, initialized and programmed to seek network signals per step 386. If network signals are not found, the front end interface 130 loops continually, seeking these signals (step 387). When network signals are found, the front end interface 130 executes the appropriate network specific connection sequence per step 388. The network 102 IP address is acquired using DHCP if the address is not static, otherwise the IP address is entered into the CMR 110 by the end user using an on-screen display or other input means.

Note that in the illustrated embodiment, the back end cable "LAN" is initialized first. It is significant to note, however, that this LAN and can operate as basically a stand-alone network via the installed HFC cabling without any connection whatsoever via the CMR 110 to the bearer network 102. Hence, one operating mode contemplated by the present invention comprises operating the backend cable LAN and CMR 110 backend processes to share data between the various user nodes, without connection to the HFC or other bearer network 102. For example, one or more of the end users may have a DSL modem (or V.90 modem) operatively coupling their PC to an outside service provider. Using well known network sharing protocols (such as those resident within MS Windows™ operating systems), such a "connected" PC may be used as the Internet access node for the backend cable LAN. Myriad other types of backend LAN configurations are possible.

Optionally, the CMR 110 may also include one or more connectors 270 (e.g., RJ-45) for direct interface of any network appliance that resides in proximity to the CMR 110, as shown in FIG. 2. Another option comprises a wireless interface as previously discussed; because the CMR 110 creates an entire Home LAN for stationary Ethernet or networked appliances, the CMR wireless option is specifically intended for mobile devices used in the premises. Examples of mobile devices include lap-tops, hand-held devices such as PDAs, web-pads, etc. Hence, the optional wireless interface of the CMR 110 is meant to provide a data interface to the CMR, Home LAN and bearer network 102, as opposed to creating the Home LAN as in the prior art.

On the Home LAN side (back end), the CMR 110 functions as a basic network router running on top of the high-frequency, high-speed cable transmission medium. The illustrated embodiment uses the dynamic host configuration protocol (DHCP) to allocate IP addresses to the various premises cable network access points 240, and also uses NAT or RSIP to convert a single bearer network 102 IP address to multiple Home LAN IP addresses. It will be recognized that the CMR may also contain a network firewall and/or virtual private network (VPN) "secure tunneling" functionality as well, such components and functionalities being readily implemented by those of ordinary skill given the present disclosure.

The exemplary CMR 110 also provides the user with GUI (e.g., on-screen) display menus for router-specific configuration items such as static network IP address, VPN setup, etc. In an alternate embodiment, the CMR 110 may be voice activated, such as via a speech recognition module of the type well known in the art. Such speech recognition apparatus may include for example a high quality, high SNR audio microphone, analog-to-digital converter (ADC), and linear predictive coding (LPC)-based analysis algorithm run on the system digital signal processor. It will be recognized that other forms of analysis, such as MFCC (Mel Frequency Cepstral Coefficients) or cochlea modeling, may be used. Phoneme/word recognition in the present embodiment is based on HMM (hidden Markov modeling), although other processes such as, without limitation, DTW (Dynamic Time Warping) or NNs (Neural Networks) may be used. Myriad speech recognition systems and algorithms are commercially available (such as for example those offered by IBM Corporation or Scansoft Inc.), all considered within the scope of the invention disclosed herein. The exemplary CMR is first trained according to the user's voice and particular command functions, and then operated by such verbal commands. Such operations may include for example initialization of the CMR 110 to, inter alia, create a new logical port, activate an existing logical port, or deactivate an existing logical port. Initialization of the logical ports may include initiation of the procedures for dedicating a portion of bandwidth from or outside of the content channel, for use by a particular node in the end user's 120 network. Activation of an existing logical port includes enabling the flow of information both upstream and/or downstream through the logical port for communication between the end user 120 devices and the bearer network 102.

It will be recognized by those of ordinary skill that the CMR 110 may be utilized in any number of hardware and software configurations. In one exemplary embodiment, the CMR 110 is very "thin' in terms of its hardware and software profile, thereby allowing low cost production and widespread distribution. As another example, a mass storage device (e.g., hard-drive) and significant quantities of processing (such as via a DSP) and memory (RAM) can be included in the CMR 110 or otherwise operatively coupled thereto. This "thicker" device could then be utilized as a network edge server specifically designed to serve the needs of a specific application, such as one household or small enterprise. It could also be used as a personal video recorder (PVR), and could supply standardized content protection as well.

Also, the CMR 110 of the invention can be integrated with other existing components if desired. For example, in another embodiment (not shown), the CMR is physically and functionally integrated within the DSTB of FIG. 2, the DTSB itself which may be integrated within a TV, home entertainment system, or other device if desired. In this way, the GUI or other user interfaces associated with the CMR are also accessible while operating the DSTB, using an interactive program or application (e.g., home shopping, video-on demand, channel directory, etc.), thereby allowing the user to configure the CMR 110 while watching television. It will be understood, however, that the CMR may also be combined with other types of devices, such as in the form of a PC card or module. For example, one could use their PC or laptop as the CMR 110, DSTB, and as an IP-conversant data networking device all in one.

Furthermore, other front-ends, such as the Narad NBAN solution previously described herein, or a Broadband Power Line (BPL) system of the type well known in the art, can be added to the CMR 110 as well.

Figure 4:
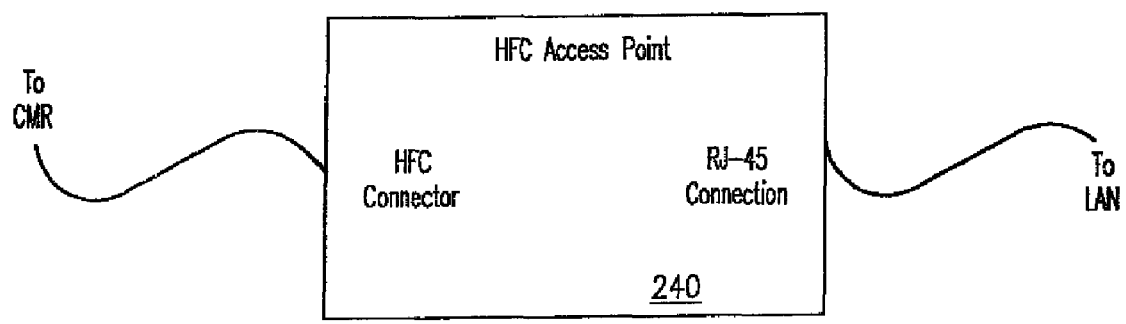
FIG. 4 is a block diagram of a first exemplary ("standalone") embodiment of the access point device according to the invention.

Exemplary premises network access points 240 (FIGS. 4 and 5) provide further networking capabilities for the end user's domain 160. The access point 240 is in a broad sense an interface between the (HFC) RF cable environment and the networked end user devices 242. In one embodiment, each access point 240 is disposed in the same room as the device 242 that requires access to the Home LAN. The HFC access point 240 can be a stand-alone device as shown in FIGS. 2 and 4 that receives the HFC cable as a first input/output and has as a second output/input, for example, a RJ-45 ethernet connection that can be plugged into a Personal Computer (PC) 242. In one exemplary variant, the access point 240 comprises a wall-mounted or in-line device having a coaxial cable connector on one end and an RJ-45 jack on the other end, the user simply plugging their PC, printer, or other end device 242 into the RJ-45 jack using standard cabling, the other end of the cable mating with a NIC or similar device in the end device 242. A splitter may also be used (not shown), wherein one output of the access point 240 provides the streamed content "passed" by the CMR 110 to an end user television or similar, while the "processed" protocol-based network data is provided via an RJ-45 or comparable network output. The access point 240 may also comprise an in-line type form factor, akin to in-line DSL filters of the type well known in the art.

Figure 4A:
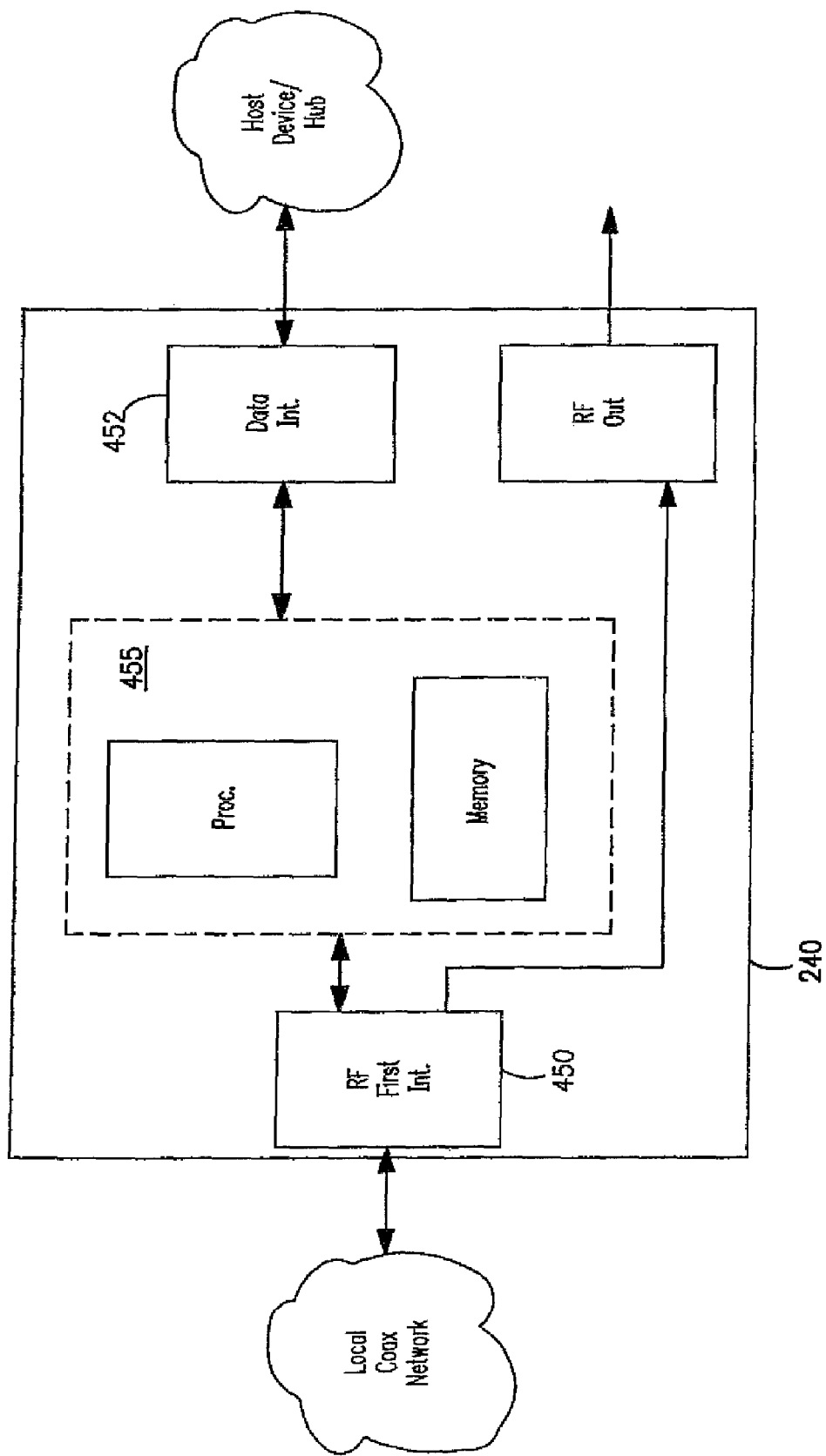
FIG. 4a is a functional block diagram of an exemplary embodiment of the network access device of FIG. 4.

FIG. 4a illustrates one exemplary hardware configuration of the access point 240 of FIG. 4, including (i) a first signal interface 450 adapted to receive data and content-based signals from the premises cabling within the hardware environment thereof and return upstream data signals to the router for delivery upstream; (ii) a second interface 452 adapted to exchange data signals with the downstream user equipment (e.g., PC) in the native hardware environment (e.g., IEEE-Std. 802.3) of that equipment; and (iii) processing components 455 adapted to perform the requite processing needed to cross between these two environments. Specifically, the exemplary processing components comprises a digital processor 457 and associated memory 458, as well as software running thereon (not shown) which places the data PDUs or other structures received from the first interface in proper format for transmission over the second interface.

The second interface 452 can comprise, in simple terms, a network interface card (NIC) of the type ubiquitous in the networking arts, although certainly other configurations may be used as well. In this regard, the exemplary processing components 455 and second interface 452 act much like a standard networked PC.

The first interface 450 acts as an RF transceiver, both (i) receiving signals transmitted at radio frequency on the HFC cabling (e.g., in the allocated "data networking" bands of the cable bandwidth) and placing these signals in an appropriate digital format or protocol which can be processed by the processing components 455 for transmission downstream; and (ii) receiving data PDUs or other structures from the processing components 455 and transmitting these over the allocated data channels on the HFC cable to the router apparatus 110 or other connected device on the local network (e.g., another access-point enabled PC within the same premises).

As previously discussed, the CMR 110 passes network content (such as video), with the front end 130 identifying network protocols and processing them accordingly, including NAT or RSIP for downstream or back end premises network nodes (access points 240). The access points 240, in comparable fashion to the CMR 110, identify the network protocols (including the generated IP address from the NAT or RSIP processes) and interface the end user device 242 via these protocols between the two hardware environments (i.e., RF/HFC and LAN). Access to any given portion of the premises cable network can also be arbitrated if desired using any one of number of different access schemes such as for example carrier-sense multiple access with collision detection (CSMA/CD), ALOHA, TDMA or even FDMA, all well known in the networking arts.

Accordingly, the access point 240 of FIG. 4a may also be equipped with a pass-through interface if desired; e.g., a co-axial connector wherein the user can directly couple a cable device such as a DSTB or monitor with tuner to the access point 240 and receive the content-based signals (e.g., MPEG encoded) for viewing. Hence, the access point can act as a local splitter if desired.

Figure 5:
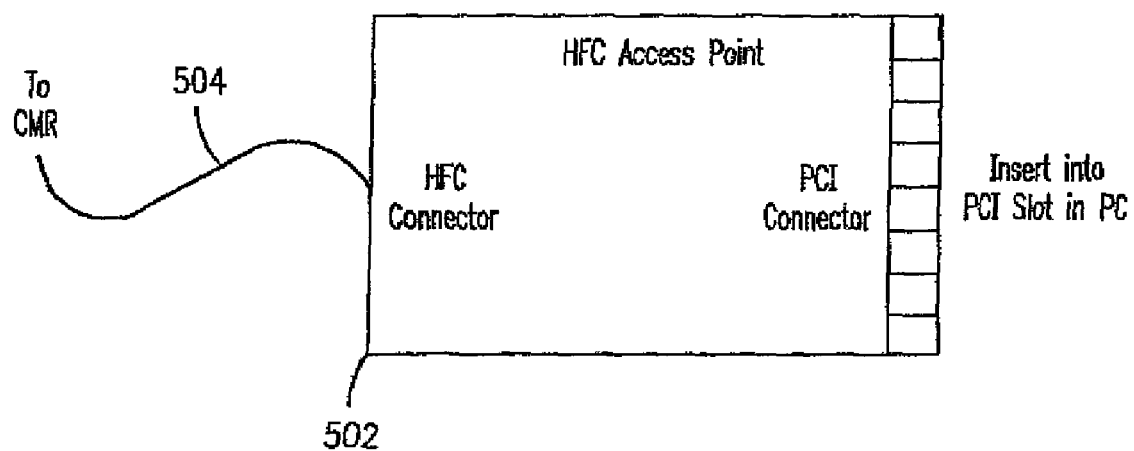
FIG. 5 is a block diagram of a second exemplary (PC card) embodiment of the access point device according to the invention.

In another variant PCI access point comprises a PC adapter card 502 as shown in FIG. 5, much like a conventional Ethernet/networking card. The local cable coaxial connector 504 mates directly to the adapter card 502 on the back face of the user's PC, and the circuitry and software of the card converts the end user's domain 160 LAN input from the CMR 110 to the native network protocol of the host device (PC) that it is inserted in. The CMR 110 communications channel(s) may either be routed through the DSTB to a cable access point 240 or routed directly from the CMR 110 to the access point 240.

In yet another embodiment of the present invention, the CMR 110 includes a wireless front end interface 130, the signal then being delivered throughout the end user's domain 160 as previously described. For example, a terrestrial RF link may be used as the basis for signal delivery to the CMR front end. Alternatively, a satellite link (such as the well known DirectTV® or DSS systems) may be used to transfer signal to the CMR front end. Other types of wireless front end links (such as millimeter wave systems) may be used consistent with the invention as well.

Business Models

As previously described, cable system operators (e.g., MSOs) typically provide internet access to their customers via cable modems at the customer premises, and cable modem termination systems (CMTS) at the head-end. If a customer with a cable modem desires multi-computer Internet access, the cable operator generally relies on the customer to lease one or more additional cable modems and associated IP addresses. This business model is flawed, however, because consumers may simply purchase a comparatively inexpensive router which can be coupled to the premises side of the cable modem to create a CAT-5, wireless, or similar Ethernet based Home-LAN.

The architecture and methods of the present invention rectify this situation. In one exemplary business model, the cable systems operator leases the CMR 110 and HFC access points 240 previously described herein to the consumer as required. MSOs can then stop leasing multiple cable modems (and charging for multiple IP addresses) as previously discussed in favor of this new arrangement. The CMR 110 leased by the MSO receives a single IP address from the bearer (e.g., HFC) network 102 and uses NAT or RSIP to convert it to multiple IP addresses on the Home LAN. Moreover, the CMR 110 and related equipment can be sold retail in a legacy network market. The CMR will maintain the Home LAN at frequencies not conflicting with those used by DOCSIS, out-of-band OOB), or TV channels. The equipment may also be provided gratis or on a highly discounted basis in exchange for, e.g., service and/or subscription commitments, etc.

Another advantage provided by the CMR 110 of the present invention is the capability to employ OOB networks other than those specified in standards such as MHP 1.0.3, and OCAP 1.0. The OpenCable standard specifies Out-Of-Band Forward Data Channel (OOB-FDC) and Reverse Data Channel (OOB-RDC) as primary communications paths for client applications. OCAP requires the OOB FDC and RDC, and makes optional DOCSIS 1.1. The OOB network is often too slow for comprehensive applications with quality-of-service (QOS) requirements, and DOCSIS has known delays and drawbacks as well. However, the CMR 110 can be advantageously implemented with a proprietary front-end interface 130, and a back-end interface 140 that converts the proprietary network traffic to DOCSIS 1.1, as well as the CMR high-speed network protocol, respectively. Hence, the router can translate from one protocol on its front end to another protocol on the back end, as well as DOCSIS 1.1 or similar. It will be recognized, however, that the back end high speed network protocol may be the same as the proprietary network protocol if desired for simplicity.

If DOCSIS is the preferred communications mechanism in an MSO network, then the bearer network front-end and LAN back-end of the CMR 110 can both be made DOCSIS-centric. In this case, the bearer network side of the CMR would appear as a standard cable modem to that network. On the back end (LAN) side, the DOCSIS channel would be passed through the CMR 110, also in the same manner as a cable modem. Hence, the downstream DOCSIS equipment would also see the CMR 110 as a cable modem. In addition, the CMR can be configured to create additional DOCSIS or proprietary channels at unused frequencies, so that additional consumer premises equipment can connect to the network and receive IP addresses from the CMR. The CMR would again appear as a DOCSIS CMTS to the consumer premises equipment connected in this manner. The CMR may assign IP addresses to HFC access points 240 using DHCP, use NAT or RSIP to split the bearer network-side IP address among the devices on the back end (LAN) side, and pass through the DOCSIS traffic to consumer premises equipment not identified as an HFC access point. The latter (i.e., passing of the DOCSIS traffic) advantageously allows MSO leased set-top boxes to behave as expected.

It is noted that many variations of the methods described above may be utilized consistent with the present invention. Specifically, certain steps are optional and may be performed or deleted as desired. Similarly, other steps (such as additional data sampling, processing, filtration, calibration, or mathematical analysis for example) may be added to the foregoing embodiments. Additionally, the order of performance of certain steps may be permuted, or performed in parallel (or series) if desired. Hence, the foregoing embodiments are merely illustrative of the broader methods of the invention disclosed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A premises network device adapted to interface between an HFC cable network and a premises network comprising coaxial cabling within a user premises and having a plurality of computerized devices coupled thereto via said coaxial cabling, said premises network device comprising:
   an apparatus adapted to utilize realm specific internet protocol (RSIP) to translate an IP address associated with said premises network device on said HFC network to a single IP address associated with said premises network;
   a first interface having a first protocol stack and adapted to:
   receive signals from said HFC network; and
   evaluate received signals and extract a first portion of said signals encoded according to an internet protocol; and
   a second interface having a second protocol stack and adapted to:
   transfer said first portion of said signals to a first set of said plurality of computerized devices via said coaxial cabling within said user premises using said single IP address associated with said premises network, said first set adapted to communicate via said internet protocol; and
   transfer a second portion of said signals to a second set of said plurality of computerized devices, said second signals not encoded according to said internet protocol;
   wherein said transfer of said first and said second portions of said signals to said first and second sets of said plurality of computerized devices comprises utilizing unused bandwidth of said coaxial cabling within said user premises.

2. The premises network device of claim 1, wherein said translation comprises allocating addresses to a plurality of logical ports associated with said premises network.

3. The premises network device of claim 2 wherein said plurality of logical ports are created by utilizing available bandwidth on an incoming communications channel.

4. The premises network device of claim 1, further comprising at least one filter, said filter adapted to block transmission of said first and second portions of said signals from said premises network device to an entity coupled to an external cable network.

5. The premises network device of claim 1, wherein at least a portion of said device is Open Cable (OCAP) compliant.

6. The premises network device of claim 1, wherein the device further comprises apparatus configured to assign respective Internet Protocol (IP) addresses to one or more access points within said premises network.

7. The premises network device of claim 6, wherein said assignment of IP addresses is conducted using a dynamic host control protocol (DHCP).

8. The premises network device of claim 1, wherein the device further comprises apparatus configured to use a network address translation (NAT) or a realm specific internet protocol (RSIP) to divide an IP address associated with said HFC cable network among one or more access points on said premises network.

9. The premises network device of claim 8, wherein said network device is further configured to pass through DOCSIS signals to one or more devices not identified as being one of said one or more access points.

10. The premises network device of claim 1, wherein said premises network device further enables individual ones of said plurality of computerized devices to communicate with one another using signal bandwidth available on said existing cable network.

11. The premises network device of claim 1, wherein said second portion of said signals transferred directly to said second set of said plurality of computerized devices comprise MPEG-encoded signals.

* * * * *